United States Patent
Roth

(10) Patent No.: US 8,850,953 B2
(45) Date of Patent: Oct. 7, 2014

(54) AXIAL PISTON MACHINE HAVING BENT AXIS CONSTRUCTION

(75) Inventor: Raimund Roth, Nersingen (DE)

(73) Assignee: Robert Bosch GmbH, Stuttgart (DE)

( * ) Notice: Subject to any disclaimer, the term of this patent is extended or adjusted under 35 U.S.C. 154(b) by 707 days.

(21) Appl. No.: 13/145,090

(22) PCT Filed: Dec. 11, 2009

(86) PCT No.: PCT/EP2009/008869
§ 371 (c)(1),
(2), (4) Date: Jul. 18, 2011

(87) PCT Pub. No.: WO2010/083861
PCT Pub. Date: Jul. 29, 2010

(65) Prior Publication Data
US 2011/0271828 A1    Nov. 10, 2011

(30) Foreign Application Priority Data
Jan. 21, 2009   (DE) .......................... 10 2009 005 390

(51) Int. Cl.
| F01B 3/02 | (2006.01) |
| F01B 3/00 | (2006.01) |
| F04B 1/12 | (2006.01) |
| F16J 1/22 | (2006.01) |

(52) U.S. Cl.
CPC .............. F01B 3/0088 (2013.01); F04B 1/126 (2013.01); F16J 1/22 (2013.01)
USPC ........................................................ 92/12.2

(58) Field of Classification Search
USPC ........... 92/12.2, 71, 187, 248; 91/488; 403/76
See application file for complete search history.

(56) References Cited

U.S. PATENT DOCUMENTS

| 2,638,850 | A | * | 5/1953 | Ferris | 403/143 |
| 3,095,221 | A | * | 6/1963 | Kaup | 403/203 |
| 3,760,692 | A | * | 9/1973 | Molly | 91/505 |
| 3,787,128 | A | * | 1/1974 | Maistrelli | 403/135 |
| 5,392,693 | A | * | 2/1995 | Engel et al. | 92/248 |
| 6,343,888 | B1 | * | 2/2002 | Huhn et al. | 403/133 |
| 7,357,067 | B2 | * | 4/2008 | Galba | 92/71 |
| 7,739,945 | B2 | * | 6/2010 | Bianchi | 92/12.2 |

FOREIGN PATENT DOCUMENTS

| DE | 2 061 906 | 6/1972 |
| DE | 24 02 066 | 8/1975 |
| FR | 744077 | 4/1933 |
| FR | 1351539 | 2/1964 |
| JP | 64-34479 | 3/1989 |
| JP | 64-34480 | 3/1989 |

OTHER PUBLICATIONS

International Search Report corresponding to PCT Application No. PCT/EP2009/008869, mailed Feb. 9, 2010 (German and English language document) (7 pages).

\* cited by examiner

*Primary Examiner* — Thomas E Lazo
(74) *Attorney, Agent, or Firm* — Maginot, Moore & Beck

(57) ABSTRACT

An axial piston machine having bent axis construction, having a drive shaft rotatably supported in a housing and ending in a drive flange comprising a face on the drive shaft side, is disclosed in which ball races are formed for receiving piston heads. The piston heads are rotatably retained in the ball races by means of deformable rings. The axial piston machine having bent axis construction possesses characteristics so that pressure relief of the ball head is ensured for all cases. The rings at the inner surface comprise at least one groove running so as to connect the ring faces to each other.

8 Claims, 2 Drawing Sheets

AXIAL PISTON MACHINE HAVING BENT AXIS CONSTRUCTION

Figure 1:
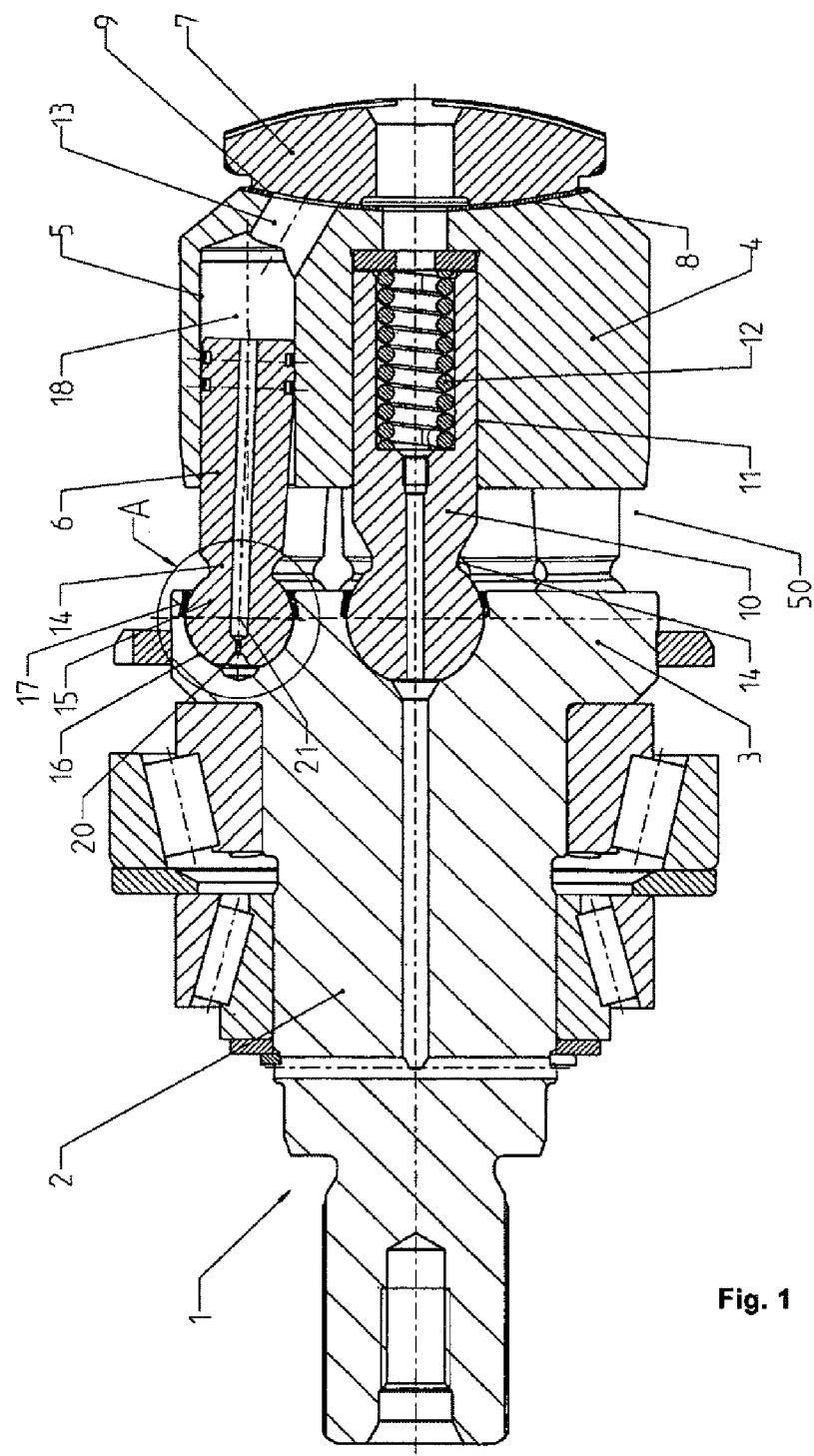

This application is a 35 U.S.C. §371 National Stage Application of PCT/EP2009/008869, filed Dec. 11, 2009, which claims the benefit of priority to application Ser. No. DE 10 2009 005 390.5, filed Jan. 21, 2009 in Germany, the disclosures of which are incorporated herein by reference in their entirety.

BACKGROUND

The disclosure relates to an axial piston machine having bent axis construction.

Known axial piston machines of this type have a drive mechanism which, as essential components, comprises a rotatably supported drive shaft with an integrally formed drive flange, a cylinder barrel with longitudinally displaceable pistons guided in axially extending cylinder bores, and a control element. After the formation of a neck, the pistons, which are guided in a longitudinally displaceable manner in the cylinder bores, each have at the free end a spherical piston head, which is received in a manner which allows rotary motion in a spherical cup formed in the drive flange. A retraction disk, which fits behind the piston heads and thus prevents them from sliding out of the spherical cups, is provided for all the piston heads. However, the production and installation of the retraction disk is an involved process. During production, the retraction hole walls must be made in such a way that friction and wear are kept low during functional operation. To allow releasable fastening of the retraction disk, additional bores are required in the disk to accept screws. Additional threaded holes are required in the drive disk to accept the fastening screws.

One known way of countering this is to replace the retraction plate by individual bearing metal rings, which hold the spherical piston heads in a manner which allows rotation. DT 20 61 906 or DT 24 02 066 A1 each show such a solution. Here, the spherical cup is provided with a widened portion into which a bearing metal ring is pressed.

It is the underlying object of the disclosure to refine an axial piston machine having bent axis construction in such a way that pressure relief of the spherical head is ensured in all cases.

SUMMARY

This object is achieved, in the case of an axial piston machine having bent axis construction having the features of the preamble, by additional provision of the features in the characterizing part of claim 1.

In an axial piston machine having bent axis construction according to the disclosure, at least one groove extending so as to connect the ring faces to each other is provided on the inner surface of the retraction rings.

Introducing a groove into a retraction ring can be accomplished in a particularly simple and rapid manner. A retraction ring embodied in this way makes possible pressure relief to the leakage oil space during the changeover process. The relief groove, as it is called, leads to an improvement in hydrostatic relief and to a reduced friction effect.

Advantageous embodiments of an axial piston machine having a bent axis construction according to the disclosure is set forth below.

According to a particularly preferred embodiment of the present disclosure, the groove extends in a spiral shape. The groove can be produced by turning by means of a simple tool directly during the production of the ring. The tool is fixed and the ring is cut by turning. This is a simple and economical way of producing the spiral groove.

Other possibilities for the shape of the relief groove are also conceivable, with one or more grooves extending axially, for example.

The inside diameter of the ring preferably widens radially at the piston head end, ensuring that pivoting of the pistons relative to the drive flange is not limited by the ring.

BRIEF DESRCIPTION OF THE DRAWINGS

Figure 2:
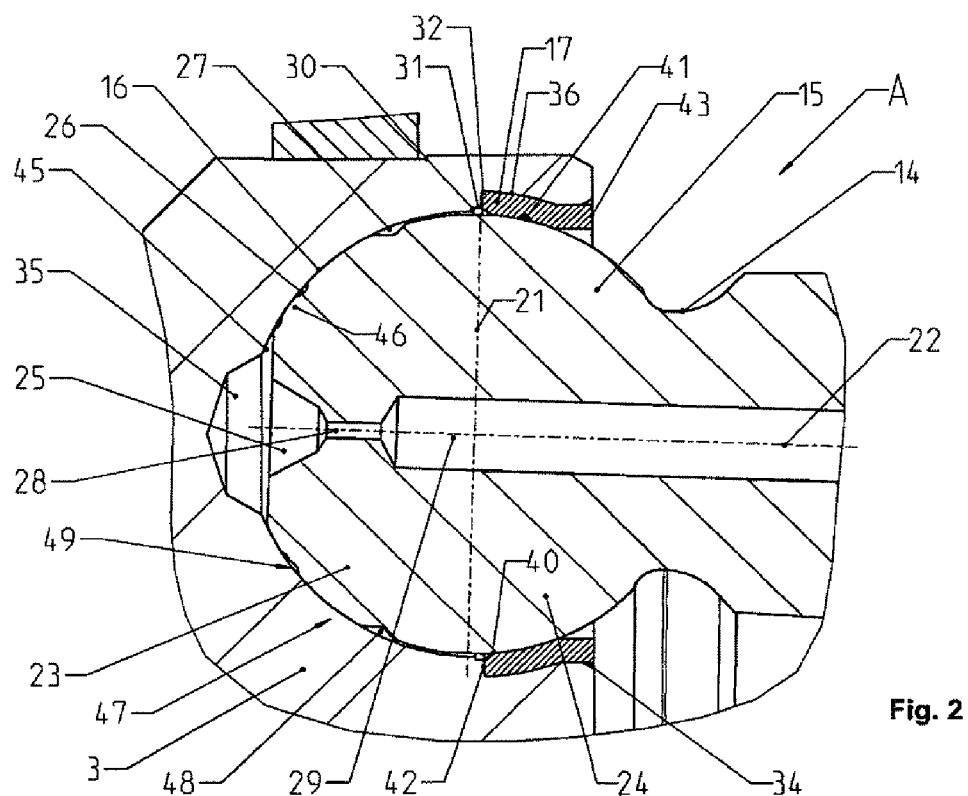
Figure 3:
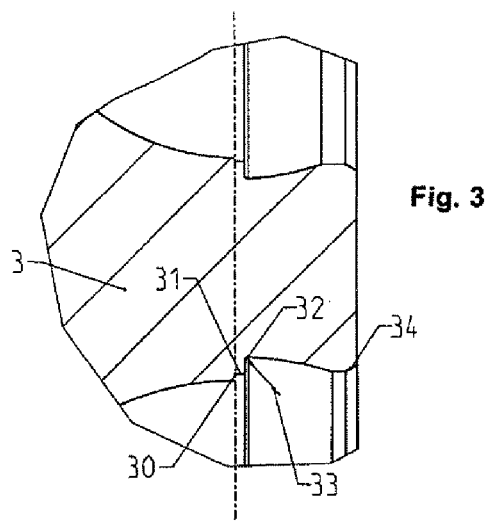
Figure 4:
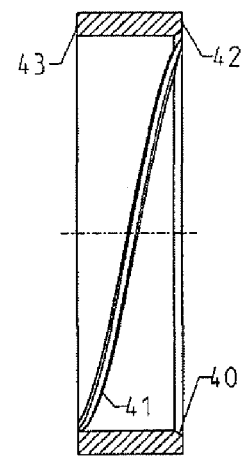

One illustrative embodiment of an axial piston machine having bent axis construction according to the disclosure is illustrated in the drawings. The disclosure will now be explained in greater detail with reference to the figures of these drawings, in which FIG. 1 shows a longitudinal section through a drive mechanism of an axial piston machine according to the disclosure, FIG. 2 shows a longitudinal section through a spherical piston head corresponding to a detail A in FIG. 1, FIG. 3 shows a longitudinal section through a drive flange portion from the end of the drive flange to a radial widened portion of two spherical cups, and FIG. 4 shows a longitudinal section through a retraction ring.

DETAILED DESCRIPTION

The drive mechanism 1 of an axial piston machine having bent axis construction, which drive mechanism is illustrated in FIG. 1, comprises, as essential components, a rotatably supported drive shaft 2 with an integrally formed drive flange 3, a cylinder barrel 4 with longitudinally displaceable pistons 6 guided in axially extending cylinder bores 5, and a control element 7. The cylinder barrel 4 is arranged between the drive flange 3 and the control element 7 and, at the control-element end, is supported by a concave bearing surface 8 on the facing convex control surface 9 of the control element 7. At the drive-flange end, the cylinder barrel 4 is supported on the drive flange 3 by way of a centering journal 10 in such a way as to be rotatable and, in particular, to allow adjustment of the working stroke of the pistons 6, so as to be pivotable.

The centering journal 10 projects into a central cylinder bore 11 and is pressed against the drive flange 3 by a compression spring 12, which is arranged between the centering journal 10 and the cylinder barrel 4. The cylinder bores 5, which extend axially and in a manner uniformly distributed around a pitch circle in the cylinder barrel 4 open via ducts 13 into the concave bearing surface 8 of the cylinder barrel 4 and, when the barrel 4 is rotated, connect the cylinder bores 5 to a pressure and suction connection (not shown) via kidney-shaped control ports (not shown). The pistons 6, which are guided in a longitudinally displaceable manner in the cylinder bores 5, are embodied with a conical shape. After the formation of a piston neck 14, the ends of the pistons 6 facing away from the cylinder barrel have, at each of the free ends thereof, spherical heads 15, which are received rotatably in spherical cups 16 formed in the drive flange 3 and are fixed by means of retraction rings 17. FIG. 2 shows a detail A from FIG. 1, which comprises a spherical head 15 fixed rotatably in a spherical cup 16 by means of a retraction ring 17. The spherical head 15 has an apex 20 and an equator 21. The center of the equator 21 corresponds to the center of the spherical head 15. The equator 21 includes an angle of 90° with the piston axis 22 and divides an upper hemisphere 23 including the apex from a lower hemisphere 24. The spherical cup 16 extends beyond the upper hemisphere 23 of the spherical head 15. The upper hemisphere 23 fits accurately into the spherical cup 16. At the level of the equator 21 of the spherical head 15, the inside diameter of the spherical cup 16 recedes radially and thereby becomes larger. The shape of the spherical cup 16 from the radial backward step 30 to an opening of the spherical cup 16 is illustrated in FIG. 3. A cylindrical transition 31 connects the radial backward step 30 and a second radial backward step 32. From this backward step 32, the spherical cup 16 has a spherical shape with a widened inside radius 33 as far as the face of the drive flange 3 and ends with a circular opening 34, which is chamfered frustoconically at an angle of 30°. Insertion of the piston head 15 into the spherical cup 16 gives rise to an annular gap 36 between the spherical cup 16 and the piston head 15 from the equator 21, and the retraction ring 17 is pressed into said gap in order to hold the piston head 15 rotatably in the spherical cup 16.

According to FIG. 4, the retraction ring 17 has a frustoconical chamfer 40 at an angle of 30° on the inner edge facing the piston, said chamfer having a depth of 5 mm. The retraction ring has a V-shaped spiral groove 41, which enables operating fluid to flow from the inner annular face 42 situated on the piston head side to the outer annular face 43 situated on the piston neck side when pressed in.

According to FIG. 2, each piston head 15 has a pocket-shaped opening 25, from which there starts a spiral groove 26 ending in an encircling annular groove 27 above the equator 21. The pocket-shaped opening 25 in the apex 20 of the piston head 15 is connected via a restrictor 28 and an adjoining piston through bore 29 to a working space 18 in the cylinder bore 5. The spherical cup 16 also has a pocket-shaped recess 35, which extends symmetrically with respect to the longitudinal axis of the spherical cup 16 and has a larger diameter than the diameter of the pocket-shaped opening 25 in the apex 20 of the spherical head 15.

The axial piston machine operates in a known manner, which will not therefore be described further.

That area of the concave spherical cup surface which corresponds to the pivoting angle range of the axial piston machine forms a bearing surface 45, on which the spherical head surface is supported by way of a mating bearing surface as a defined relief surface 46 by virtue of a pressure field 49 formed in a bearing gap 48. The relief surface 46 of a hydrostatic bearing 47 resulting therefrom is bounded by the encircling groove 27 on the upper hemisphere 23.

To build up the pressure field 49, operating medium flows from the working space 18, through the piston through bore 29, via the restrictor 28 and into the pocket-shaped opening 25 in the piston head 15. Upstream of the restrictor 28, the prevailing pressure is the supply pressure, while a defined feed pressure is established at the relief surface 46. The pressure field 49 absorbs the piston force and thus prevents metallic contact between the spherical head 15 and the concave spherical cup surface 45. If the piston force increases, the bearing gap 48 becomes smaller. The feed pressure rises until the pressure difference across the restrictor 28 is virtually zero, i.e. the feed pressure corresponds approximately to the supply pressure. The bearing 47 is now hydrostatically relieved. If the piston force decreases, the bearing gap 48 becomes larger, the feed pressure falls and approaches the supply pressure until the bearing 47 is hydrostatically relieved at approximately equal pressures.

During the changeover process from high pressure to low pressure, the supply pressure falls abruptly while the feed pressure is still very high. The spherical head 15 is now pressed into the retraction ring 17 and operating fluid can flow out into a leakage oil space 50 via the spiral groove 41 in the retraction ring 17. The feed pressure falls and, as pressure equilibrium is approached, the spherical bearing 47 is hydrostatically relieved.

The shape of the groove in the retraction ring is not limited to a spiral but it is important that the faces of the ring should be connected via the groove. The connection exists even when there is at least one axially extending groove, for example.

The invention claimed is:

1. An axial piston machine having bent axis construction, having a drive shaft rotatably supported in a housing and ending in a drive flange having a face on the side remote from the drive shaft, in which spherical cups are formed for receiving piston heads, in which the piston heads are rotatably retained in the spherical cups by means of deformable rings, and in which the rings have at the inner surface at least one groove extending so as to connect the ring faces to each other.

2. The axial piston machine as claimed in claim 1, wherein the groove extends in a spiral shape.

3. The axial piston machine as claimed in claim 1, wherein the groove extends axially.

4. The axial piston machine as claimed in claim 1, wherein the inside diameter of the ring is widened radially at the piston head end.

5. An axial piston machine having bent axis construction, comprising:
  a housing;
  a drive shaft rotatably supported in the housing and including a drive flange defining a face in which spherical cups are formed;
  a plurality of piston heads rotatably positioned in the spherical cups; and
  a plurality of deformable rings respectfully positioned within the spherical cups and respectively interposed between the drive shaft and the plurality of pistons,
  wherein each of the plurality of deformable rings defines (i) a first annular end face, (ii) a second annular end face, and (iii) an inner surface interposed between the first annular end face and the second annular end face, and
  wherein the inner surface has at least one groove extending from the first annular end face to the second annular end face.

6. The axial piston machine as claimed in claim 5, wherein the groove extends in a spiral shape.

7. The axial piston machine as claimed in claim 5, wherein the groove extends axially.

8. The axial piston machine as claimed in claim 5, wherein:
  each of the plurality of deformable rings defines a first inner diameter at the first annular end face and a second inner diameter at the second annular end face, and
  the first inside diameter is greater than the second inner diameter.

* * * * *